US007716328B2

(12) United States Patent
Surtani et al.

(10) Patent No.: US 7,716,328 B2
(45) Date of Patent: May 11, 2010

(54) CALCULATION OF THE DEGREE OF PARTICIPATION OF A SERVER IN A CLUSTER USING HALF-LIFE DECAY

(75) Inventors: Manik Ram Surtani, London (GB); Jason Thomas Greene, Madison, WI (US)

(73) Assignee: Red Hat, Inc., Raleigh, NC (US)

( * ) Notice: Subject to any disclaimer, the term of this patent is extended or adjusted under 35 U.S.C. 154(b) by 344 days.

(21) Appl. No.: 11/986,249

(22) Filed: Nov. 19, 2007

(65) Prior Publication Data

US 2009/0132695 A1    May 21, 2009

(51) Int. Cl.
    *G06F 15/173*    (2006.01)
(52) U.S. Cl. ..................................... 709/224
(58) Field of Classification Search ............. 709/224
    See application file for complete search history.

(56) References Cited

OTHER PUBLICATIONS

Ben Wang, JBoss Cache as a POJO Cache, Nov. 9, 2005, pp. 1-13, Published on ONJava.com.

*Primary Examiner*—Vivek Srivastava
*Assistant Examiner*—Taylor Elfervig
(74) *Attorney, Agent, or Firm*—Blakely, Sokoloff, Taylor & Zafman LLP (57) ABSTRACT

A method and apparatus for calculating a degree of participation of a server in a group of servers is disclosed. In one embodiment, a memory stores timestamps for each access to the server. A processor weights the timestamps to treat more recent accesses as more important than older accesses, wherein older accesses decay in importance exponentially using a half-life constant.

10 Claims, 6 Drawing Sheets

CALCULATION OF THE DEGREE OF PARTICIPATION OF A SERVER IN A CLUSTER USING HALF-LIFE DECAY

TECHNICAL FIELD

Embodiments of the present invention relate to servers in a group, and more specifically to a method for calculating a degree of participation of a server in the group.

BACKGROUND

A cluster of servers may include two or more servers. Each server in the cluster provides a redundant backup information to another server in the cluster. Accordingly, server redundancy is desirable such that if a server in the cluster fails, another server in the cluster will automatically take over the failed server.

However, a large number of servers in a cluster may result in a large number of data being exchanged thereby impacting memory and network traffic. As such, servers in the cluster that are minimally accessed may take bandwidth and memory space as the data from these servers is unnecessarily replicated to other servers in the cluster for redundancy. Therefore, what is needed is a technique for calculating a degree of participation of a server in a cluster to determine whether the server is to remain in the cluster.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for a method and apparatus for calculating a degree of participation of a server in a group or cluster of servers. In one embodiment, timestamps for each access to each server is stored. A processor weights the timestamps to treat more recent accesses as more important than older accesses. Older accesses decay in importance exponentially using a half-life constant.

Figure 1:
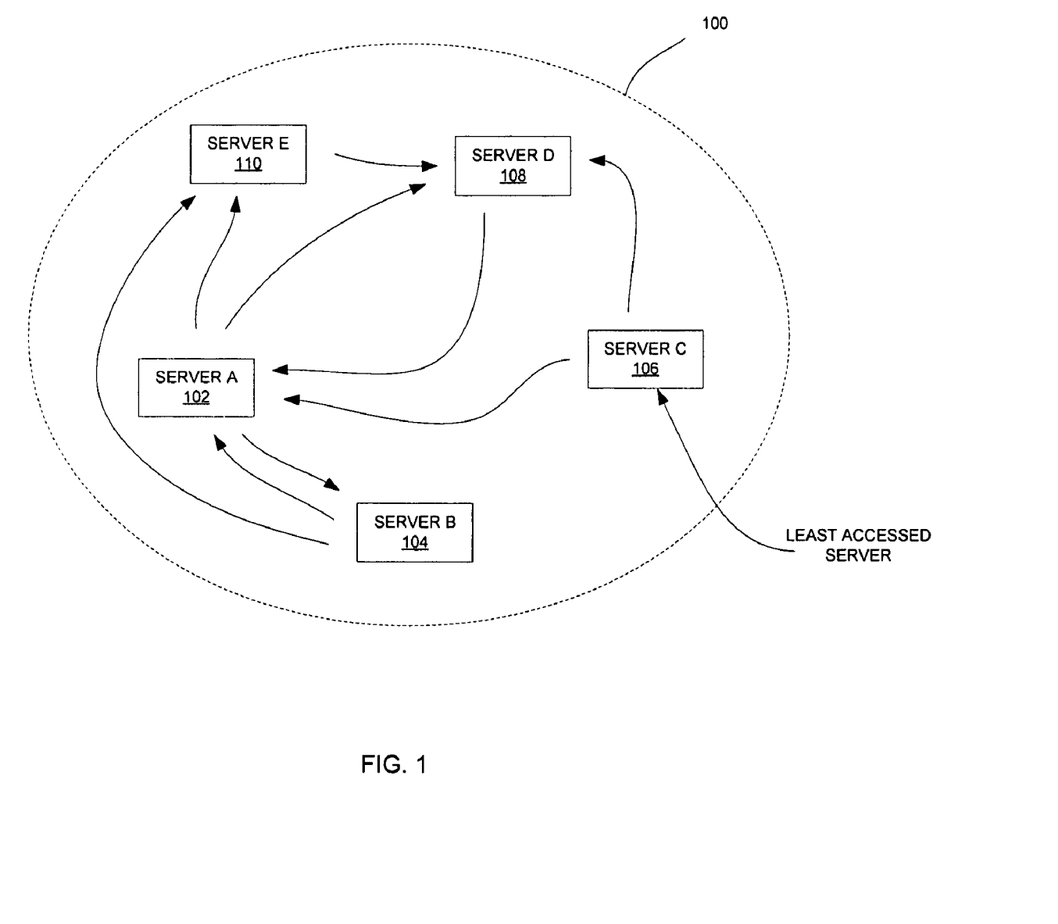
FIG. 1 illustrates a block diagram of a cluster of servers.

FIG. 1 illustrates a block diagram of a cluster 100 of servers: server A 102, server B 104, server C 106, server D 108, and server E 110. Because the cluster provides redundancy backup, an instance of data from a server may also be replicated to one or more servers in cluster 100. FIG. 1 illustrates an example of data accesses during a period of time. Server A 102 has accessed data from server B 104, server D 108, and server E 110. Server B has accessed data from server A 102. Server C 106 has accessed data from server A 102, server D 108. Server D 108 has accessed data from server A 102. Server E 110 has accessed data from server D 108. The arrows in FIG. 1 represent each data access from a server. Based on the above example, data from server C 106 is least accessed while data from server A 102 and server D 108 are most accessed. As such, server C 106 appears to be the least accessed server and may be a good candidate for removal from the cluster.

The above example illustrates accesses for a period of time. The cumulative accesses over time may provide a better representation of the degree of participation of each server in the cluster 100. However, the accumulation of timestamps may impact memory and network resources of the servers in the cluster.

Figure 2:
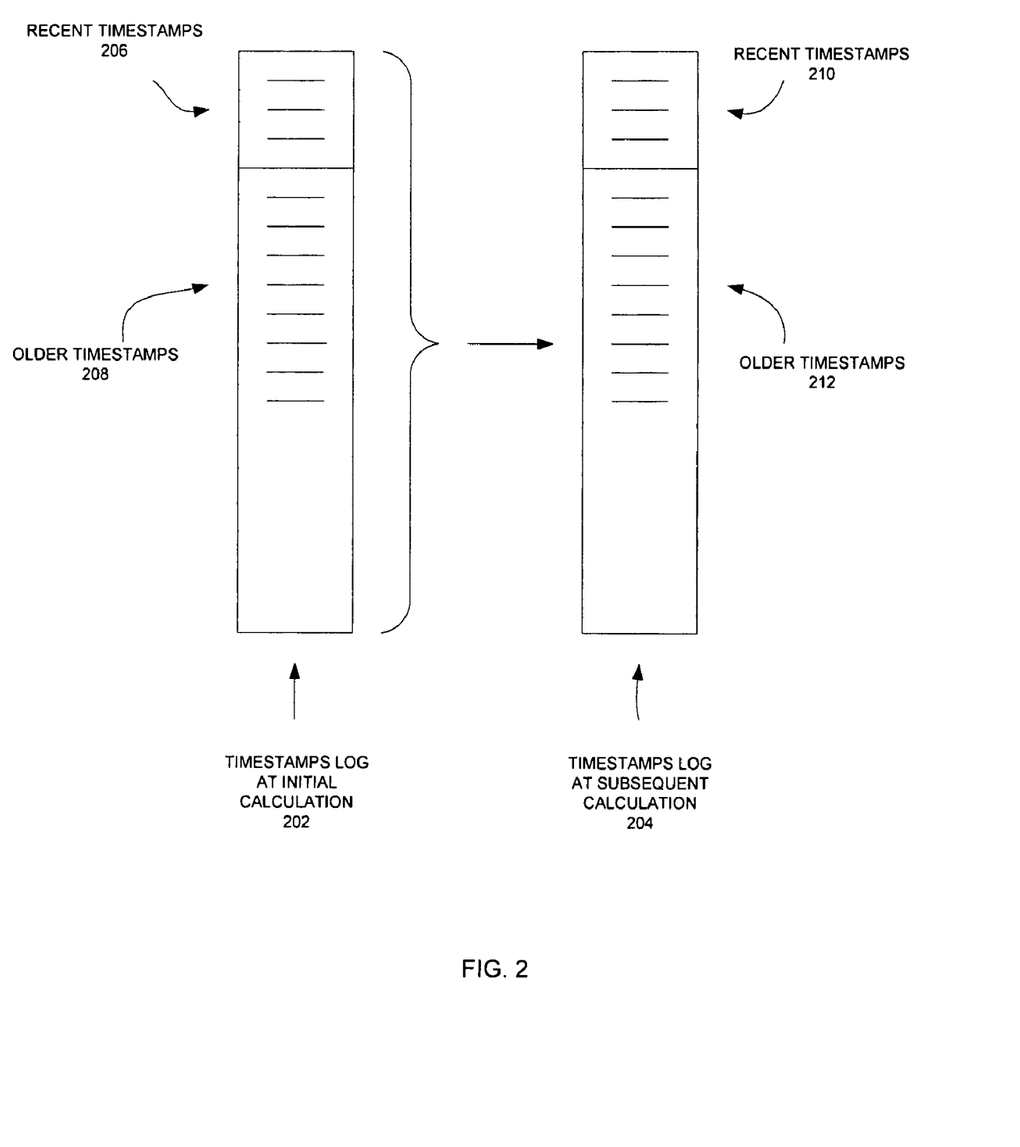
FIG. 2 illustrates a block diagram of one embodiment of timestamps for each server.

FIG. 2 illustrates a block diagram of a time stamp log for a server of a cluster. A log of time stamps is maintained for each data access to a server in the cluster 100. The log of time stamps 202 at an initial calculation include recent time stamps 206 and older time stamps 208. For illustration purposes, recent time stamps 206 may represent time stamps from the last several hours, for example, eight hours. In this case, any time stamps older than eight hours may be included as part of the older time stamps 208.

When a subsequent computation of the degree of participation is later performed, the log of time stamps 204 includes recent time stamps 206 and older time stamps 212. The older time stamps 212 may be a cumulative indicator representing time stamps from the previous log of time stamps 202.

One embodiment of a degree of participation weight algorithm may be based on half-life decay of participation importance. To calculate the degree of participation in a partition, each node or server maintains: a degree of participation (Dp), a timestamp of when this was calculated (Dt), a list of timestamps when the partition was accessed (At), a half-life decay constant which is used to reduce the importance of accesses over time (H), e.g., an event that occurred H milliseconds ago is deemed half as important as an event that occurs now. In one embodiment, H is configurable, with a default of eight hours.

Every time an eviction message is sent out by any of the servers, each server recalculates its degree of participation, updates Dp and Dt, and clears Lt. If an eviction message was received, Dp is sent back to the initiator of eviction message.

Dp can be calculated using the following algorithm:

Let Tc be the current time, in milliseconds, of the calculation (System.currentTimeMillis( ))

if Dp!=0, re-weight Dp $Dp = Dp \times (½^{((Tc-Dt)/H)})$

Dt=Tc

Now, the new access events are added:

$Dp = Dp + (½^{((Tc-At)/H)})$

The list of At collected is emptied.

This gives is a mechanism of maintaining the participation degree (Dp) without maintaining all access events as this is digested periodically. The algorithm above maintains the weight of accesses, treating more recent accesses as more important than older accesses. Older accesses decay in importance exponentially, using the half-life constant passed in.

A function is included to add the number of accesses as well, since Dp=Dp+f(At) so instances that accessed a participation a significantly larger number of times in the past may still have a higher participation weightage to instances that accessed the partition only once, but very recently.

Figure 3:
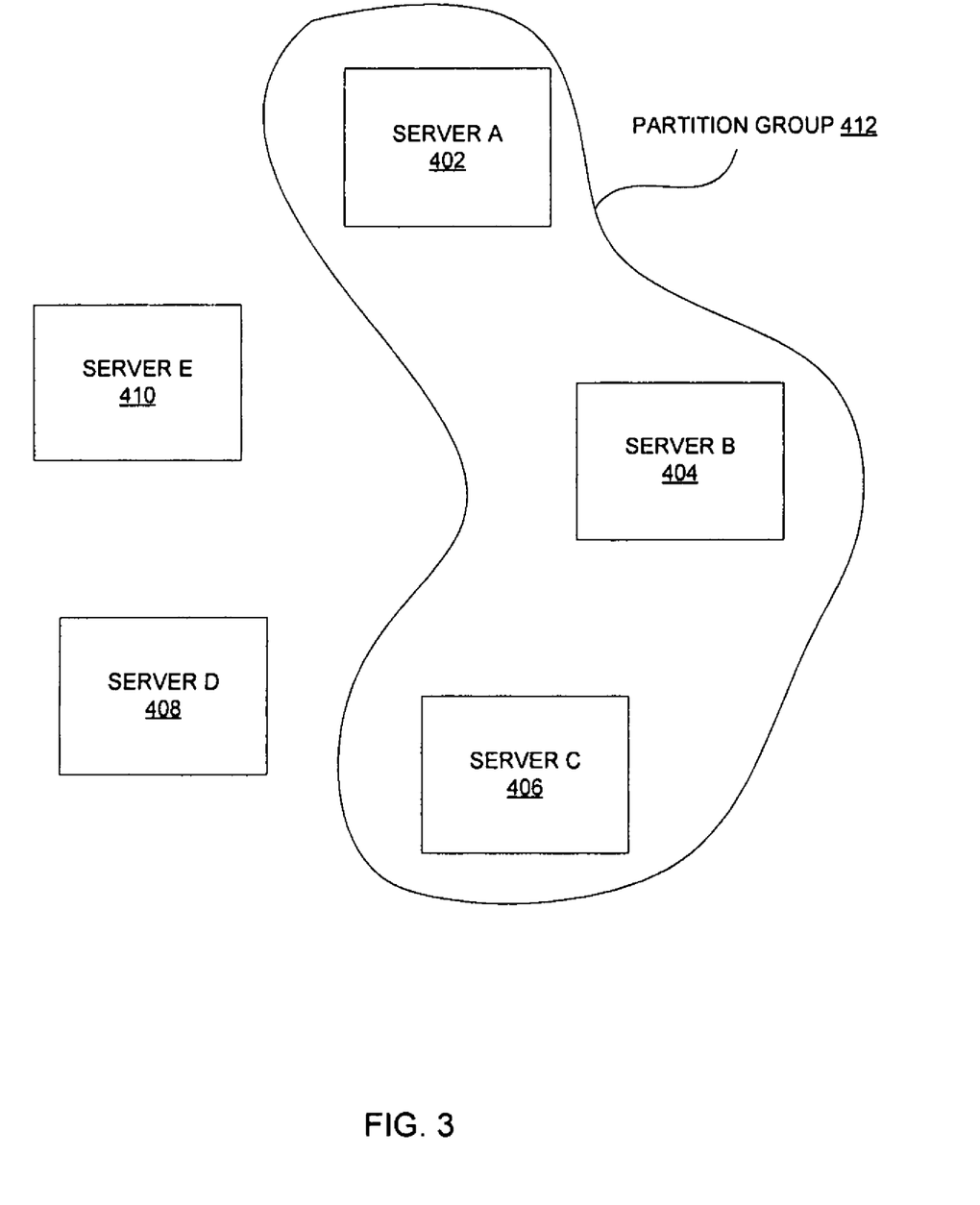
FIG. 3 illustrates a block diagram of an example of a partition group.
Figure 4:
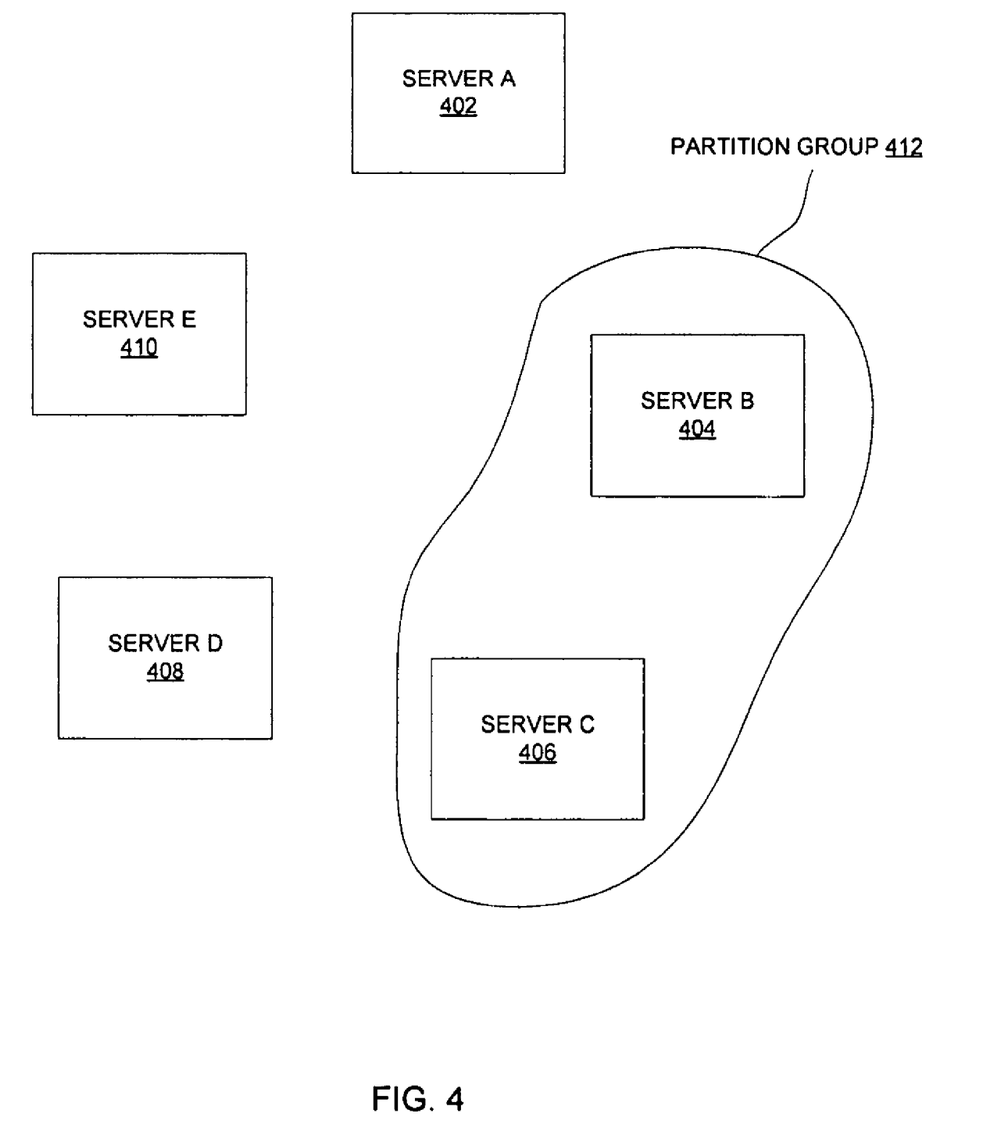
FIG. 4 illustrates a block diagram of an example of a reduced partition group.

FIG. 3 illustrates several servers: server A 402, server B 404, server C 406, server D 408, and server E 410. A partition group 412 composed of server A 402, server B 404, and server C 406 may form node/a/b. Each server in the group 412 store its own data, and the backup data of one or more other servers in the group 412. A degree of participation of each server in the group 412 is computed using the above described algorithm. For example, if the degree of participation computation indicates that server A 402 is the least accessed server of partition group 412, server A 402 may be removed or evicted from partition group 412 resulting in a smaller partition group 412 as illustrated in FIG. 4. In accordance with another embodiment, more than one server may be evicted or removed from a group or cluster of servers.

Computer System

Figure 5:
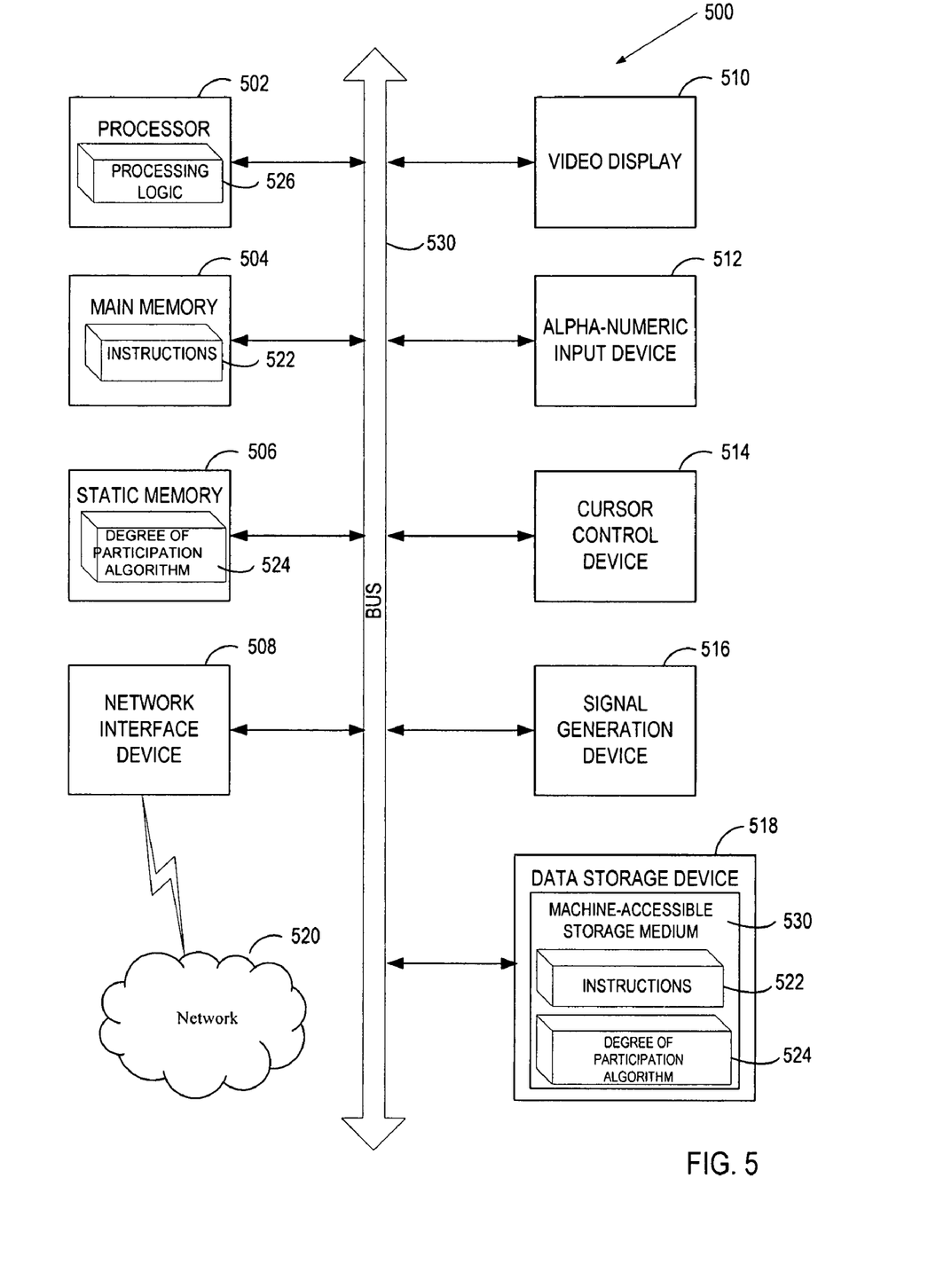
FIG. 5 illustrates a block diagram of an exemplary computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store degree of participation algorithm 524. degree of participation algorithm 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

Figure 6:
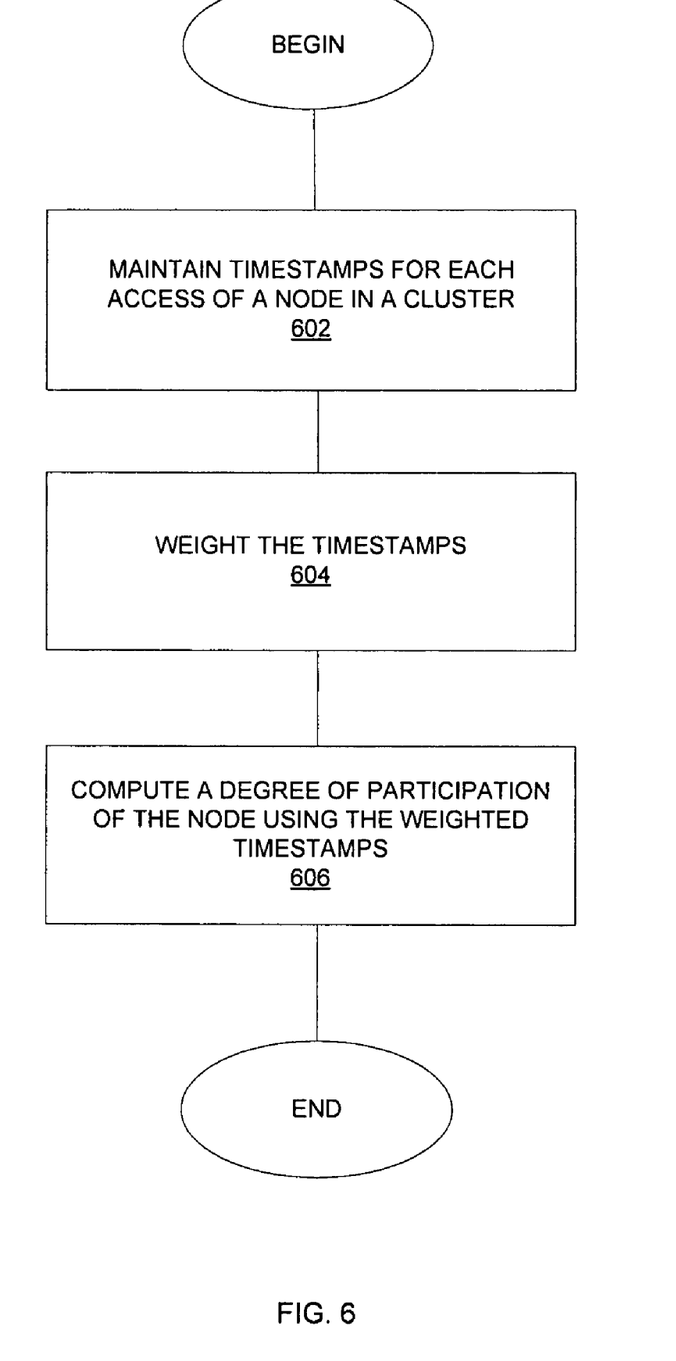
FIG. 6 illustrates a flow diagram of one embodiment of a method for determining a degree of participation of a server or node in a cluster.

FIG. 6 illustrates a flow diagram of one embodiment of a method for dynamically partitioning data across a cluster in a distributed-tree structure. At 602, timestamps for each access to the server are stored. At 604, a processor weights the timestamps to treat more recent accesses as more important than older accesses, wherein older accesses decay in importance exponentially using a half-life constant. At 606, the processor computes the degree of participation of the server using the weighted timestamps.

In one embodiment, the degree of participation is a function of a total number of accesses to the cache node. Each cache server or cache node in the cluster maintains the following: a degree of participation (Dp), a timestamp of when the degree of participation was calculated (Dt), a list of timestamps when the group was accessed (At), a half-life decay constant (H). The degree of participation (Dp) is computed with $Dp = Dp \times (\frac{1}{2}^{((Tc-At)/H)})$, wherein Tc is the current time in milliseconds. In one embodiment, H may be adjustable. By default H may be 8 hours.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

Thus, a method and apparatus for calculating a participation of a server or node has been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for calculating a degree of participation of a cache node of a cluster of cache nodes in a tree-based structure, the method comprising:
   maintaining a log of timestamps for each access to the cache node;
   weighting the timestamps to treat recent accesses with priority over older accesses, wherein older accesses decay in priority exponentially using a half-life constant;
   storing, for each cache node in the cluster, a degree of participation (Dp), a timestamp of when the degree of participation was calculated (Dt), a list of timestamps when the group was accessed (At), a half-life decay constant (H), wherein Dp and Dt are calculated and stored to minimize the number of elements in At; and
   computing the degree of participation (Dp) with $Dp = Dp \times (\frac{1}{2}^{((Tc-At)/H)})$, wherein Tc is the current time in milliseconds,
   wherein the degree of participation is a function of a total number of accesses to the cache node.

2. The computer-implemented method of claim 1 further comprising:
   emptying the list of At collected after computing the degree of participation Dp.

3. A computer-implemented method for calculating a degree of participation of a server in a group of servers, the method comprising:
   maintaining a log of timestamps for each access to the server; and
   weighting the timestamps to treat recent accesses with priority over older accesses, wherein older accesses decay in priority exponentially using a half-life constant;
   storing, for each cache node in the group, a degree of participation (Dp), a timestamp of when the degree of participation was calculated (Dt), a list of timestamps when the group was accessed (At), a half-life decay constant (H), wherein Dp and Dt are calculated and stored to minimize the number of elements in At; and
   computing the degree of participation (Dp) with $Dp = Dp \times (\frac{1}{2}^{((Tc-At)/H)})$, wherein Tc is the current time in milliseconds,
   wherein the degree of participation is a function of a total number of accesses to the server.

4. The computer-implemented method of claim 3 further comprising:
   emptying the list of At collected after computing the degree of participation Dp.

5. A computer-readable storage medium, having instructions stored therein, which when executed, cause a computer system to perform a method for calculating a degree of participation of a cache node of a cluster of cache nodes in a tree-based structure comprising:
   maintaining a log of timestamps for each access to the cache node; and
   weighting the timestamps to treat recent accesses with priority over older accesses, wherein older accesses decay in priority exponentially using a half-life constant;
   storing, for each cache node in the cluster, a degree of participation (Dp), a timestamp of when the degree of participation was calculated (Dt), a list of timestamps when the group was accessed (At), a half-life decay constant (H), wherein Dp and Dt are calculated and stored to minimize the number of elements in At; and
   computing the degree of participation (Dp) with $Dp = Dp \times (\frac{1}{2}^{((Tc-At)/H)})$, wherein Tc is the current time in milliseconds,
   wherein the degree of participation is a function of a total number of accesses to the cache node.

6. The computer-readable storage medium of claim 5 wherein the method further comprises:
   emptying the list of At collected after computing the degree of participation Dp.

7. A computer-readable storage medium, having instructions stored therein, which when executed, cause a computer system to perform a method for calculating a degree of participation of a server in a group of servers comprising:
   maintaining a log of timestamps for each access to the server;
   weighting the timestamps to treat recent accesses with priority over older accesses, wherein older accesses decay in priority exponentially using a half-life constant;
   storing, for each cache node in the cluster, a degree of participation (Dp), a timestamp of when the degree of participation was calculated (Dt), a list of timestamps when the group was accessed (At), a half-life decay constant (H), wherein Dp and Dt are calculated and stored to minimize the number of elements in At; and
   computing the degree of participation (Dp) with $Dp = Dp \times (\frac{1}{2}^{((Tc-At)/H)})$, wherein Tc is the current time in milliseconds,
   wherein the degree of participation is a function of a total number of accesses to the server.

8. The computer-readable storage medium of claim 7 wherein the method further comprises:

emptying the list of at collected after computing the degree of participation Dp.

9. An apparatus for calculating a degree of participation of a cache node of a cluster of cache nodes in a tree-based structure, the apparatus comprising:

a memory configured to store a log of timestamps for each access to the cache node; and a processor coupled to the memory, the processor configured to weight the timestamps to treat recent accesses with priority over older accesses, wherein older accesses decay in priority exponentially using a half-life constant, wherein the memory is configured to store, for each cache node in the cluster, a degree of participation (Dp), a timestamp of when the degree of participation was calculated (Dt), a list of timestamps when the group was accessed (At), a half-life decay constant (H), Dp and Dt are calculated and stored to minimize the number of elements in At, wherein the processor is configured to compute the degree of participation (Dp) with $Dp = Dp \times (\frac{1}{2}^{((Tc-At)/H)})$, wherein Tc is the current time in milliseconds, and to empty the list of At collected after computing the degree of participation Dp.

10. An apparatus for calculating a degree of participation of a server in a group of servers, the apparatus comprising:

a memory configured to store a log of timestamps for each access to the server; and a processor coupled to the memory, the memory configured to weight the timestamps to treat recent accesses with priority over older accesses, wherein older accesses decay in priority exponentially using a half-life constant, wherein the memory is configured to store, for each server in the group, a degree of participation (Dp), a timestamp of when the degree of participation was calculated (Dt), a list of timestamps when the group was accessed (At), a half-life decay constant (H), Dp and Dt are calculated and stored to minimize the number of elements in At, wherein the processor is configured to compute the degree of participation (Dp) with $Dp = Dp \times (\frac{1}{2}^{((Tc-At)/H)})$, wherein Tc is the current time in milliseconds, and to empty the list of At collected after computing the degree of participation Dp.

* * * * *